(12) United States Patent
Zeller et al.

(10) Patent No.: US 7,937,076 B2
(45) Date of Patent: May 3, 2011

(54) SOFTWARE DEFINED RADIO FOR LOADING WAVEFORM COMPONENTS AT RUNTIME IN A SOFTWARE COMMUNICATIONS ARCHITECTURE (SCA) FRAMEWORK

(75) Inventors: Scott Zeller, Shortsville, NY (US); Daniel E. Stephens, Rochester, NY (US); Michael E. Wilkerson-Barker, Hilton, NY (US)

(73) Assignee: Harris Corporation, Melbourne, FL (US)

( * ) Notice: Subject to any disclaimer, the term of this patent is extended or adjusted under 35 U.S.C. 154(b) by 1009 days.

(21) Appl. No.: 11/682,922

(22) Filed: Mar. 7, 2007

(65) Prior Publication Data
US 2008/0220757 A1    Sep. 11, 2008

(51) Int. Cl.
*H04M 3/00* (2006.01)
*H04M 1/00* (2006.01)
(52) U.S. Cl. ............ 455/418; 455/419; 455/552.1
(58) Field of Classification Search ........ 455/552.1, 455/550.1, 418, 403, 419, 420; 713/1, 2; 717/120, 121
See application file for complete search history.

(56) References Cited

U.S. PATENT DOCUMENTS

| | | | |
|---|---|---|---|
| 3,932,847 A | 1/1976 | Smith | 340/172.5 |
| 4,349,890 A | 9/1982 | Chang | 364/900 |
| 5,040,158 A | 8/1991 | Lee et al. | 368/10 |
| 5,327,468 A | 7/1994 | Edblad et al. | 375/107 |
| 6,678,654 B2 | 1/2004 | Zinser, Jr. et al. | 704/221 |
| 6,691,082 B1 | 2/2004 | Aguilar et al. | 704/219 |
| 6,804,169 B2 | 10/2004 | Addy et al. | 368/10 |
| 6,917,914 B2 | 7/2005 | Chamberlain | 704/219 |
| 7,177,590 B1* | 2/2007 | Stevens | 455/3.04 |
| 7,404,074 B2* | 7/2008 | Murotake | 713/100 |
| 7,487,493 B1* | 2/2009 | Faulkner | 717/105 |
| 7,490,350 B1* | 2/2009 | Murotake et al. | 726/11 |
| 7,499,724 B2* | 3/2009 | Palum et al. | 455/550.1 |
| 2002/0116184 A1 | 8/2002 | Gottsman et al. | 704/220 |
| 2003/0114163 A1 | 6/2003 | Bickle et al. | 455/450 |
| 2003/0125939 A1 | 7/2003 | Zinser, Jr. et al. | 704/219 |
| 2003/0135366 A1 | 7/2003 | Zinser, Jr. et al. | 704/229 |
| 2003/0149809 A1 | 8/2003 | Jensen et al. | 710/22 |
| 2003/0195006 A1 | 10/2003 | Choong et al. | 455/450 |
| 2004/0133554 A1 | 7/2004 | Linn et al. | 707/2 |
| 2004/0192361 A1 | 9/2004 | Yossef et al. | 455/505 |
| 2005/0075869 A1 | 4/2005 | Gersho et al. | 704/223 |
| 2005/0159943 A1 | 7/2005 | Zinser, Jr. et al. | 704/219 |
| 2006/0069554 A1 | 3/2006 | Gottesman et al. | 704/222 |
| 2006/0168587 A1* | 7/2006 | Aslam-Mir | 718/105 |
| 2007/0087735 A1* | 4/2007 | March et al. | 455/418 |
| 2007/0299659 A1* | 12/2007 | Chamberlain | 704/219 |
| 2008/0184038 A1* | 7/2008 | Fitton | 713/187 |
| 2009/0125782 A1* | 5/2009 | Josefiak et al. | 714/758 |

FOREIGN PATENT DOCUMENTS
WO    00/33297    6/2000
* cited by examiner

*Primary Examiner* — Sonny Trinh
(74) *Attorney, Agent, or Firm* — Allen, Dyer, Doppelt, Milbrath & Gilchrist, P.A.

(57) ABSTRACT

A software defined radio includes a radio circuit and an executable radio software system operable with the radio circuit and conforming to the software communications architecture (SCA) specification. An operating environment is defined and includes a plurality of waveform components that are loaded when the radio circuit is initialized or a waveform component is instantiated, and reloaded at runtime after the waveform component is instantiated for transmitting and receiving voice data.

29 Claims, 12 Drawing Sheets

DSP LOADABLE COMPONENT BINARY FILE FORMAT

SOFTWARE DEFINED RADIO FOR LOADING WAVEFORM COMPONENTS AT RUNTIME IN A SOFTWARE COMMUNICATIONS ARCHITECTURE (SCA) FRAMEWORK

FIELD OF THE INVENTION

The present invention relates to communications, and more particularly, this invention relates to software defined radios and to the software communications architecture (SCA) for such radios and other applications.

BACKGROUND OF THE INVENTION

With advances in processing capabilities and programming technologies, software defined mobile wireless communications devices (e.g., radios) continue to increase in popularity. Rather than relying upon hardware and circuitry components to perform tasks such as frequency, modulation, bandwidth, security functions, and waveform requirements, these functions are performed by software modules or components in a software defined radio. In a software defined radio (SDR), analog signals are converted into the digital domain where the above-noted functions may be performed using digital signal processing.

Because most of the functions of the radio are controlled by software, these radios may typically be implemented with relatively standard processor and hardware components. This may not only reduce device hardware costs, but also provide greater flexibility in upgrading the device since new communications waveform modules can be uploaded to the device relatively easily and without the need to interchange new hardware components.

One particular class of software defined radio, which takes advantage of the above-described advantages and features, is the Joint Tactical Radio (JTR). The JTR radio includes relatively standard radio and processing hardware along with the appropriate waveform software modules for the communication waveforms the radio will use. JTR's also use operating system software that conforms with the Software Communications Architecture (SCA) Specification (see www.JTRS.saalt.mil), which is hereby incorporated by reference in its entirety. The SCA is an open architecture framework that specifies how hardware and software components interoperate such that different manufacturers and developers can readily integrate their respective components into a single device.

Still another class of mobile wireless communications devices that increasingly use software components for communicating with different waveforms or protocols are cellular communication devices. That is, many cellular devices are now designed to operate with more than one of the numerous cellular standards that are used throughout the world, such as the Global System for Mobile Communications (GSM) and Personal Communications Services (PCS), for example.

The Joint Tactical Radio System (JTRS) Software Communications Architecture (SCA) defines a set of interfaces and protocols, often based on the Common Object Request Broker Architecture (CORBA), for implementing a software defined radio. In part, JTRS and its SCA are used with a family of software reprogrammable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them; some may be implemented by non-core applications (i.e., waveforms, etc.); and some may be implemented by hardware device providers. The specifications for the JTRS radio and SCA typically require an interface for command and data (red and black) processing systems. A radio platform may include multiprocessor embedded systems, including Field Programmable Gate Arrays (FPGA's).

In this type of framework, instead of using a custom build for individual radios, the system uses XML files associated with waveform components and hardware devices that allow waveform start-up to be defined while allocating components. When objects are instantiated, they can be distributed among different processing elements of the radio with a set of XML files associated with each software and hardware object.

The SCA framework provides a mechanism for loading a driver or executable when the waveform is instantiated. There are still requirements to dynamically reload DSP components at run-time from a list of platform and waveform-specific components. A common DSP core is still needed that can request components and an extension of the SCA framework to provide the components to the DSP. In current systems, a DSP image is loaded as a static binary image when the radio is initialized or a waveform is instantiated as specified by the waveform XML. After the waveform is instantiated, there is no further loading. This is not always desirable.

SUMMARY OF THE INVENTION

A software defined radio includes a radio circuit and an executable radio software system operable with the radio circuit and conforming to the software communications architecture (SCA) specification. An operating environment is defined and includes a plurality of waveform components that are loaded when the radio circuit is initialized or a waveform component is instantiated, and reloaded at runtime after the waveform component is instantiated for transmitting and receiving voice data.

The radio circuit further comprises a radio device and memory. A waveform XML can specify one or more waveform components to be cached within memory by the radio device at waveform instantiation. The radio device can be formed as a voice device operable as a vocoder. Each waveform component can be formed as a header and waveform-specific component identifier (ID) in its header that is marked active as waveform components are cached in memory. The radio device is operable for loading a waveform component based on an active ID.

A digital signal processor (DSP) is included in which waveform components are loaded. The DSP is operative for requesting waveform component changes.

Image files can be associated with waveform components. The cached waveform components can include a header and inactive ID that prevents other waveform components from loading any image files associated with a waveform component in cache. A portable housing can contain the radio circuit and be configured for handheld use. The radio circuit can be formed as a red (command) subsystem and black (data) radio subsystem each having an operating environment conformable to the SCA specification.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In accordance with a non-limiting example of the present invention, a software defined radio and associated method provide a mechanism within the SCA for a waveform to select dynamically a component for use at run-time from a list of platform and waveform-specific components that are loaded upon instantiation. Components can be cached in memory to reduce instantiation and load times. Component identifiers need only be unique within the context of a currently instantiated waveform. Thus, the SCA based architecture of a software defined radio allows for different components to be specified by the waveform XML, and includes a predefined mechanism for loading a component at run-time. It is possible to use the software defined radio and method as described as a standard mechanism for JTRS SCA based radios. Third party DSP components can be integrated and secure DSP components can be separated from a platform DSP core.

Figure 1:
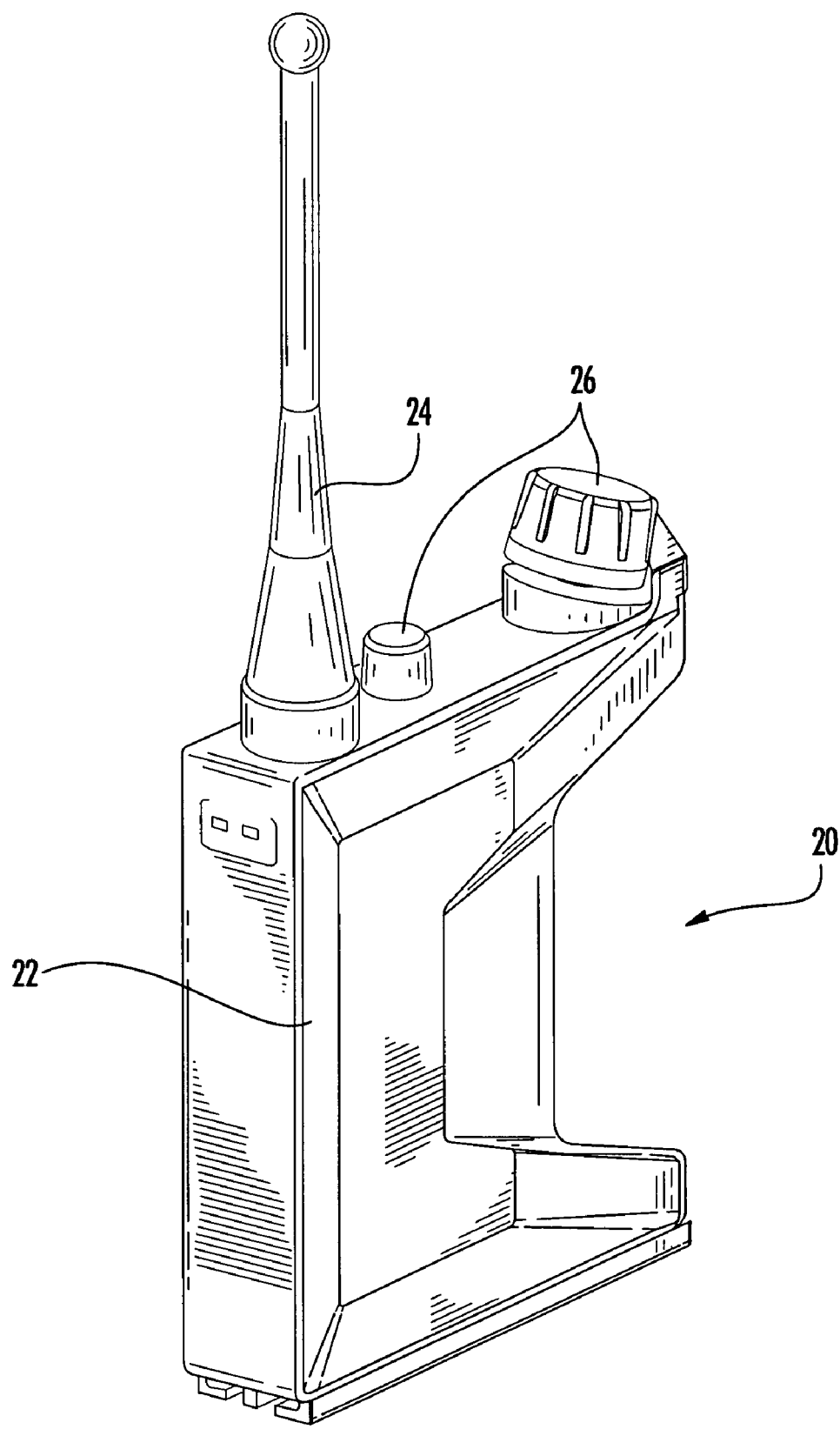
FIG. 1 is a perspective view of a portable wireless communications device as a handheld radio that could incorporate the software defined radio and method in accordance with a non-limiting example of the present invention.

The software defined radio has dynamic DSP component loading in an SCA framework. In accordance with non-limiting examples of the present invention, multiprocessor embedded systems and related methods can be used with the radio software communications architecture as described, including mainframe computers or small computers, including laptops with an added transceiver, such as used by military and civilian applications, or portable wireless communications device 20 as illustrated in FIG. 1. The portable wireless communications device is illustrated as a radio that can include a transceiver as an internal component and handheld housing 22 with an antenna 24 and control knobs 26. A Liquid Crystal Display (LCD) or similar display can be positioned on the housing in an appropriate location for display. The various internal components, including dual processor systems for red and black subsystems and software that is conforming with SCA, is operative with the illustrated radio. Although a portable or handheld radio is disclosed, the architecture as described can be used with any processor system operative with the transceiver using SCA. An example of a communications device in accordance with non-limiting examples of the present invention is the Falcon® III manpack or tactical radio platform manufactured by Harris Corporation of Melbourne, Fla.

Figure 2:
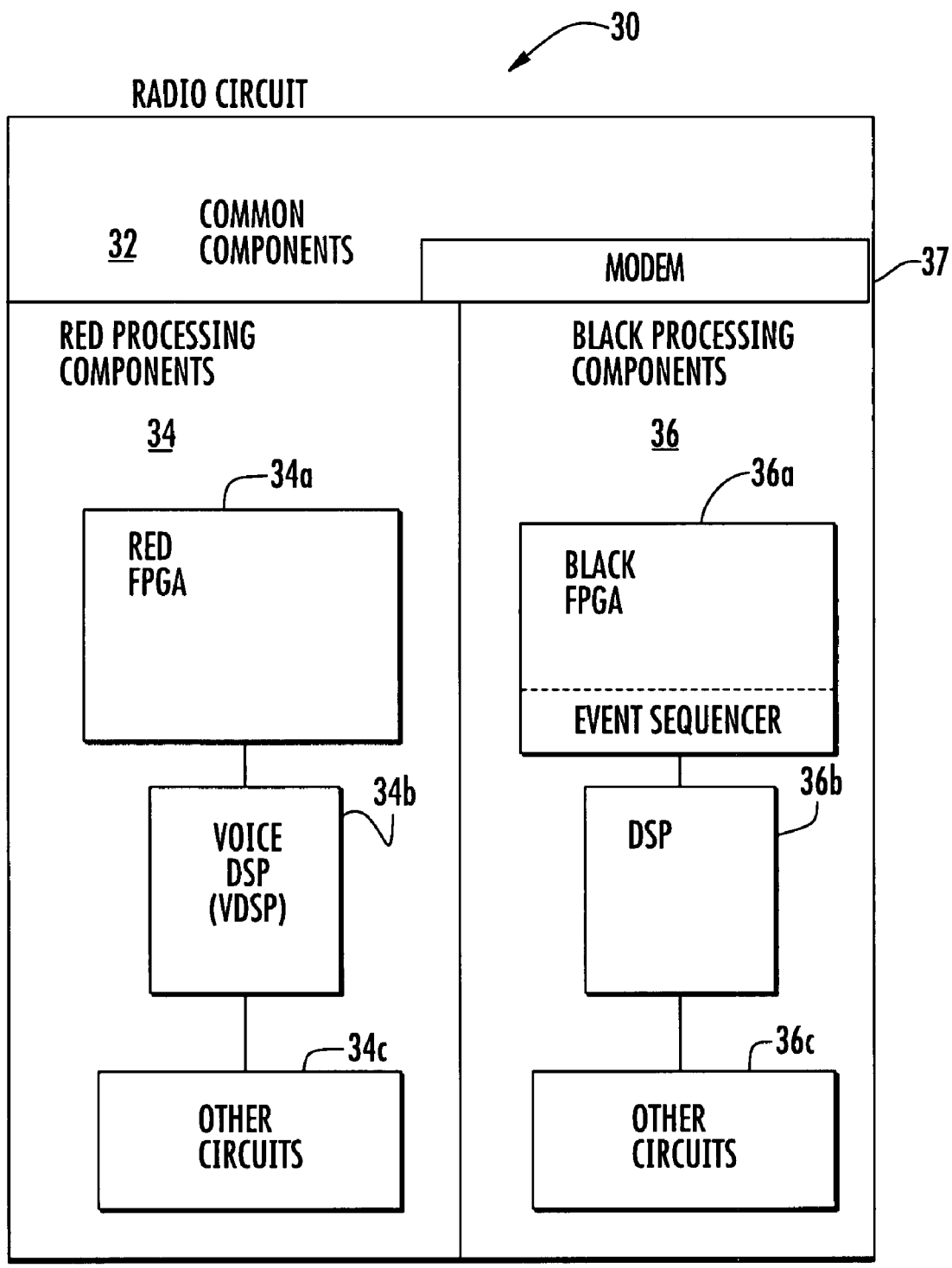
FIG. 2 is a high-level block diagram of a typical radio circuit used in a software defined radio that uses the Software Communications Architecture (SCA) framework.

A basic radio circuit 30 such as used in a software defined radio as described above is shown generally by the block diagram at 30 (FIG. 2) and includes common radio components indicated generally at 32 and red processing components 34 and black processing components 36 operable with a modem 37. Each of the red and black processing components 34,36 include a field programmable gate array 34a, 36a, digital signal processor 34*b*, 36*b* with the red being a Voice DSP (VDSP) and other circuit components 34*c*, 36*c*, known to those skilled in the art.

Figure 3:
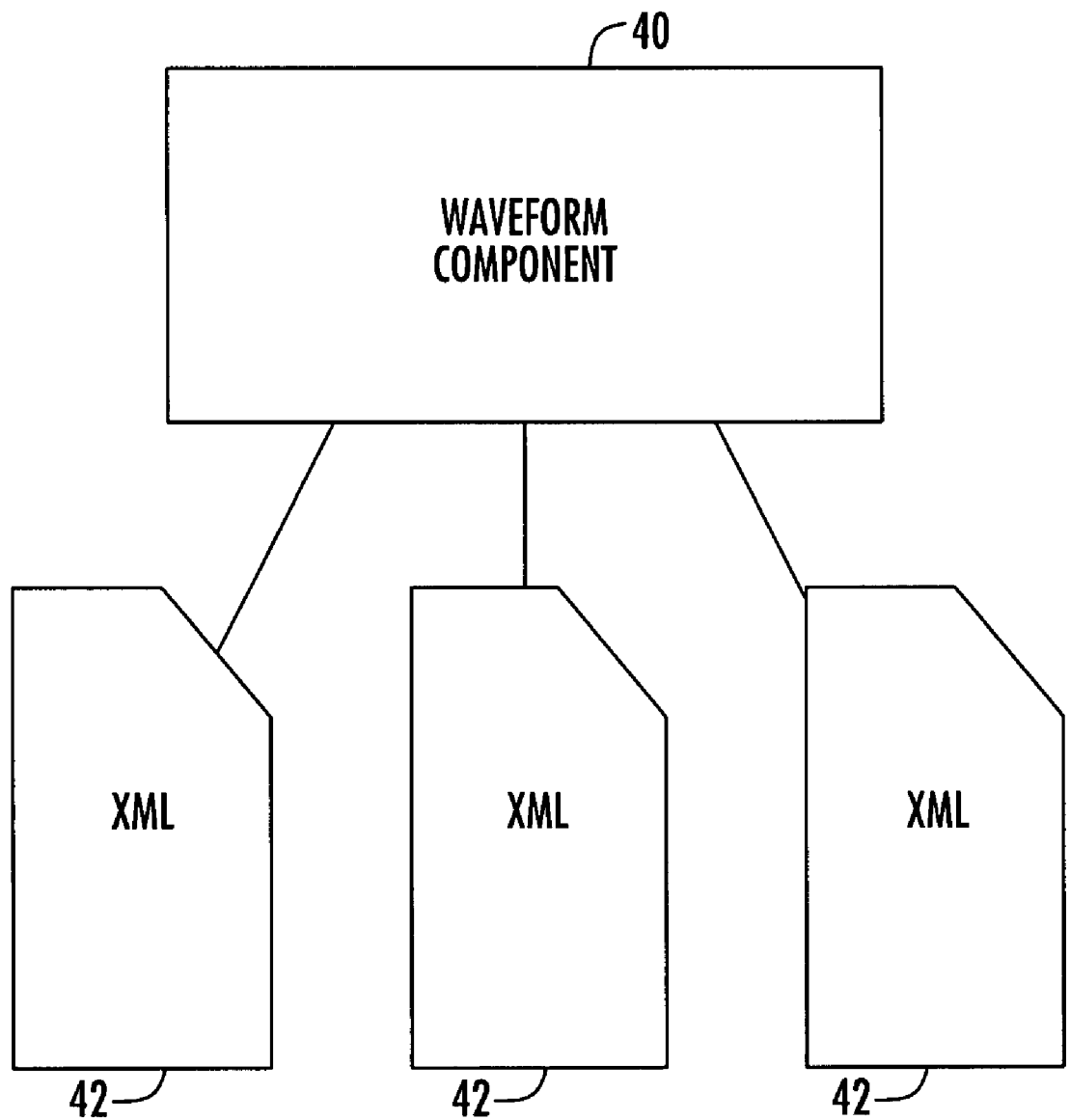
FIG. 3 is a block diagram showing an example of a waveform component and XML files associated with the waveform component.

FIG. 3 shows a basic waveform component 40 and a number of XML files 42 associated with the waveform component. It should also be understood that the XML files can also be associated with hardware devices.

Figure 4:
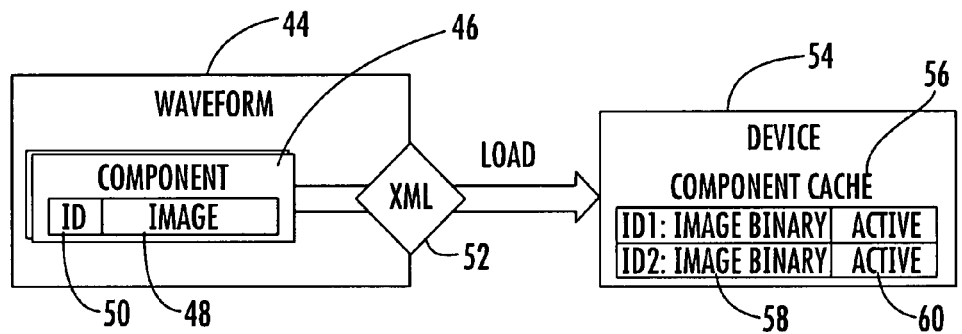
FIG. 4 is a high-level block diagram showing waveform instantiation.

FIG. 4 shows a block diagram for waveform instantiation, in accordance with a non-limiting example of the present invention. The waveform 44 is illustrated with the waveform component 46 having an image 48 and ID 50. The XML is shown at 52. It loads with the device 54 that includes a component cache 56 together with the binary image 58 and the active identifier 60.

The waveform XML 52 specifies one or more components 46 to be cached in the component cache 56 by a particular device 54. Each component 46 contains a waveform-specific component ID 50 in its header. Components are cached in memory and labeled with the component ID 58 and set with the "active" identifier 60. Cached images can be retained until the radio is reset. If the component was already cached, it is only marked as "active" and does not have to be loaded from a file system.

Figure 5:
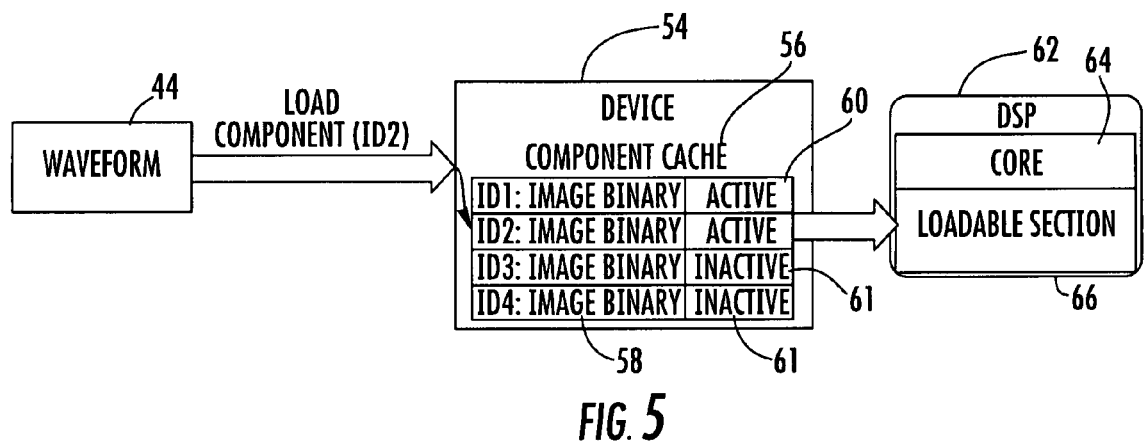
FIG. 5 is a high-level block diagram showing component loading and run time in accordance with a non-limiting example of the present invention.

FIG. 5 shows a block diagram similar to FIG. 4, but also showing the device 54 with component cache 56 and ID's 58 that are both active 60 and inactive 61. The DSP 62 includes a core 64 with a loadable section 66.

At run-time, a waveform dynamically requests a component to be loaded by the ID. The device locates the component within the cache by looking at only the "active" entries. The device loads the cache image binary into the DSP 62. Alternatively, the request for a component change could be initiated by the DSP and could prevent reloading of the component if it is already loaded.

Figure 6:
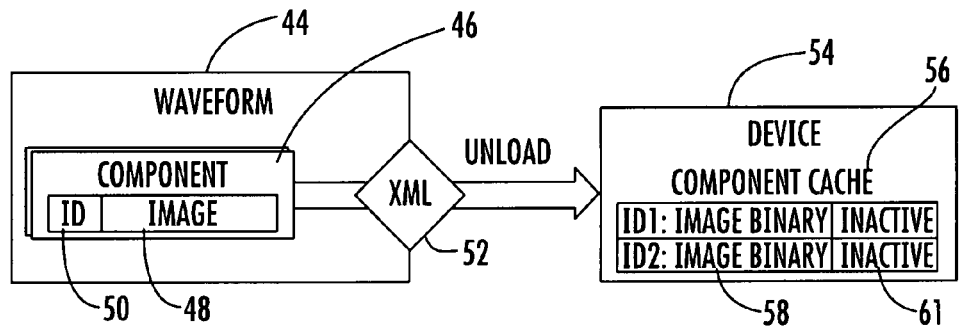
FIG. 6 is a high-level block diagram showing waveform de-instantiation in accordance with a non-limiting example of the present invention.

FIG. 6 shows waveform de-instantiation. Components 46 that are cached upon instantiation are requested to be unloaded by the waveform XML 52 and the SCA. The device 54 marks the appropriate cached components as "inactive" 61, preventing other waveforms from loading these components. The image remains in the cache. Waveforms 44 can have components 46 with the same component ID's since only "active" components can be loaded.

There now follows a more detailed explanation of the process as described relative to vocoder implementations in an SCA framework. There first follows some background information regarding vocoders used in SCA frameworks for software defined radios, followed by more details of a loadable vocoder feature in accordance with one non-limiting example of the present invention.

Voice coders, also termed vocoders, are circuits that reduce bandwidth occupied by voice signals, such as by using speech compression technology, and replace voice signals with electronically synthesized impulses. For example, in some vocoders an electronic speech analyzer or synthesizer converts a speech waveform to several simultaneous analog signals. An electronic speech synthesizer can produce artificial sounds in accordance with analog control signals. A speech analyzer can convert analog waveforms to narrow band digital signals. Using some of this technology, a vocoder can be used in conjunction with a key generator and modulator/demodulator device to transmit digitally encrypted speech signals over a normal narrow band voice communication channel. As a result, the bandwidth requirements for transmitting digitized speech signals are reduced.

A military standard vocoder (MIL-STD-3005) algorithm is referred to as the Mixed Excitation Linear Prediction (MELP), which operates at 2.4 Kbps. When a vocoder is operated using this algorithm, it has good voice quality under benign error channels.

The mixed excitation linear predictive (MELP) vocoder algorithm is the 2400 bps federal standard speech coder selected by the United States Department of Defense (DOD) digital voice processing consortium (DDVPC). It is somewhat different than the traditional pitch-excited LPC vocoders that use a periodic post train or white noise as an excitation, foreign all-pole synthesis filter, in which vocoders produce intelligible speech at very low bit rates that sound mechanical buzzy. This typically is caused by the inability of a simple pulse train to reproduce voiced speech.

A MELP vocoder uses a mixed-excitation model based on a traditional LPC parametric model, but includes the additional features of mixed-excitation, periodic pulses, pulse dispersion and adaptive spectral enhancement. Mixed excitation uses a multi-band mixing model that simulates frequency dependent voicing strength with adaptive filtering based on a fixed filter bank to reduce buzz. The MELP vocoder synthesizes speech using either periodic or aperiodic pulses. The pulse dispersion is implemented using fixed pulse dispersion filters based on a spectrally flattened triangle pulse that spreads the excitation energy with the pitch. An adaptive spectral enhancement filter based on the poles of the LPC vocal tract filter can enhance the formant structure in synthetic speech. The filter can improve the match between synthetic and natural bandpass waveforms and introduce a more natural quality to the speech output. The MELP coder can use Fourier Magnitude Coding of the prediction residual to improve speech quality and vector quantization techniques to encode the LPC and Fourier information.

In accordance with a non-limiting example of the present invention, the Loadable Vocoder Feature can solve problems associated when the VDSP is running out of room for expansion (additional Vocoders). The software defined radio releases or provides waveform-specific vocoders, for example, Improved Multi-Band Excitation (IMBE) in the P25 Waveform without requiring a re-release of the platform code base.

The software defined radio separates out the larger platform vocoders (LPC/MELP and CVSD) into separately built images that are loaded upon radio startup into a GPP-based cache of vocoders. A consequence of this is that DSP build tools (and GPP-based DSP loaders) are modified to handle a new non-contiguous image load format.

The software defined radio allows waveforms to provide waveform-specific vocoders as drivers for the voice device, which becomes a loadable device in the waveform XML. These vocoders are cached during a first instantiation of the waveform by a DSP device.

The DSP device maintains a cache of available vocoders. When a waveform is instantiated, a VDSP_ConfigureForAudioxx request is sent to the DSP specifying the requested vocoder. If that vocoder is not present within the current DSP image and vocoder combination, a request is made back to DSP device to "load" the vocoder from the GPP cache.

A request is made to the DSP device from the DSP to load the vocoder from the GPP cache. To optimize the load process, a fast bootloader may be used to load all DSP images at the full DSP clock rate.

Vocoders are linked against the base DSP image at a specific base address. An image header is similar to that of base DSP images, including a vocoder ID and a jump table for all Vocoder primitives (functions). Vocoders can link against the platform. Therefore, a fixed (limited) set of functions are provided (via jump table) that a given vocoder can use to call into the DSP platform.

Figure 7:
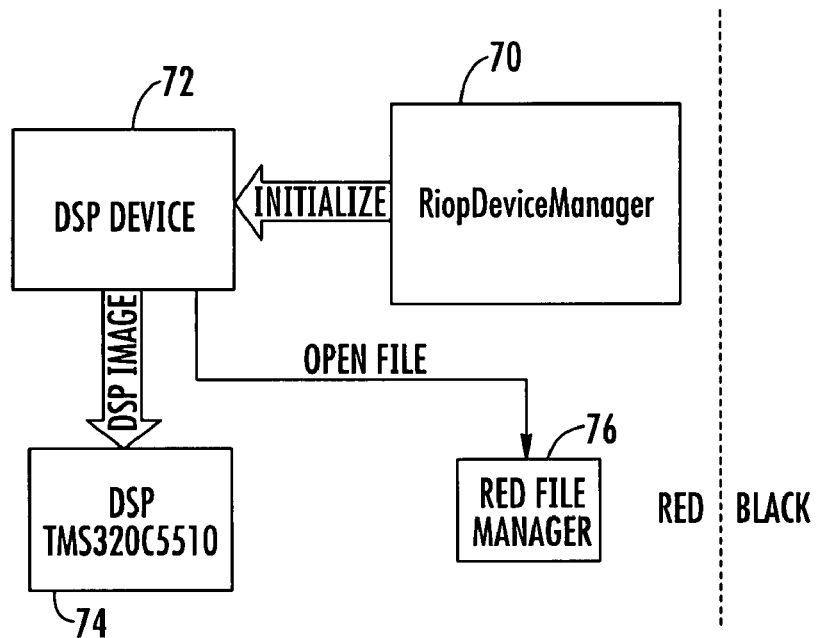
FIG. 7 is a block diagram showing an original VDSP (red DSP) loading process.

FIG. 7 is a block diagram of basic components used for loading the VDSP (Voice DSP) on power-up when the Riop-DeviceManager 70 initializes its Devices and Services. When the SubclassInitialize( ) function is called on the DSP device 72, it uses a hard-coded path on the red side for locating the image to be loaded into the DSP 74. The method for loading the DSP is to put the processor in reset and load the binary image while the DSP speed is around 20 MHz. Once the radio is up and running, the VDSP is not reloaded again. The DSP device 72 signals the file manager 76 as illustrated.

A fast loader approach can be used to speed up the loading of the VDSP image. The fast loader is a small DSP image that is initially loaded into the DSP at 20 MHz, which then bumps the DSP speed to 200 MHz for loading the main DSP image. A loading gain of approximately 50 ms is seen. The vocoders will be separated into smaller libraries that are loaded at runtime to reduce the overall size of the VDSP image and allow waveforms to provide custom vocoders. A vocoder library is loaded using a byte block load, which copies the image into a specific location within the DSP memory. When the VDSP is configured for a TX or RX session, the VDSP will request the vocoder to be loaded by the DSP Device. Once the vocoder library is loaded an running, it can load additional vocoder libraries, as needed.

The platform software and any waveform application can contain one or more loadable vocoders that can be loaded into the VDSP. The platform vocoders will be placed in the /usr/images/vocoders directory and all .bin files in this directory will be loaded during power-up. The waveform-specific vocoders are specified as drivers for the Voice Device in the waveform XML. These vocoders will be loaded during instantiation of the waveform.

Figure 8:
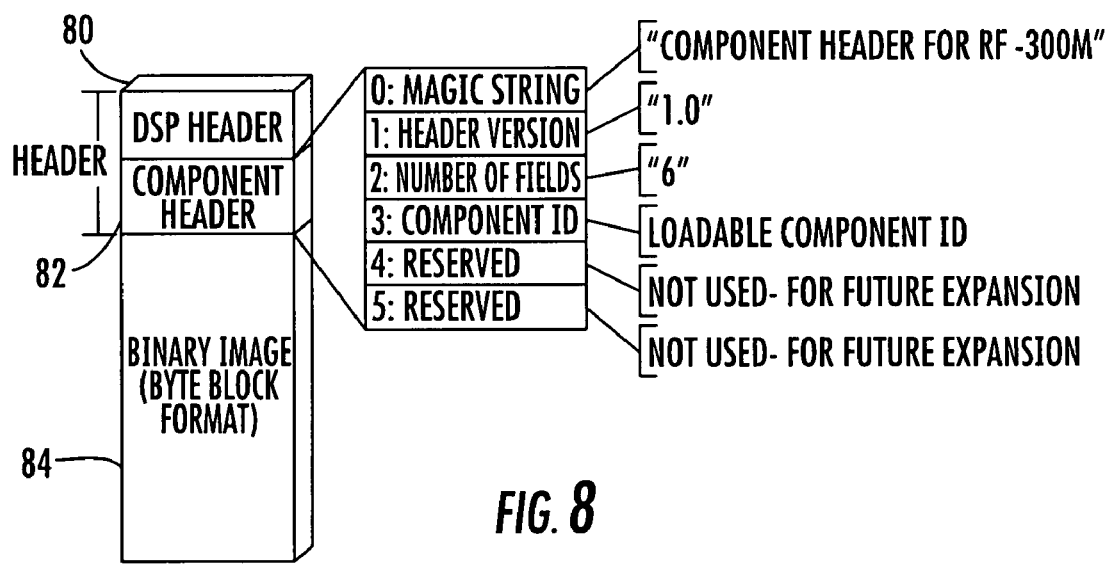
FIG. 8 is a block diagram showing the DSP loadable component header in accordance with a non-limiting example of the present invention.

Each vocoder is identified by a Vocoder ID, which is specified in the binary image header and allows a waveform to reference the vocoder using this ID. The built-in vocoders can be referenced using an enumeration as is currently done. The Voice Device will translate the enumeration value to the appropriate Vocoder ID. The IDs for Waveform vocoders are assigned by the waveform designers and begin at 100. The ID's assigned are unique among the built-in vocoders and any other vocoders provided by that waveform. A new version of the DSP header can be used for the loadable components, as shown in FIG. 8, which shows DSP loadable component header and DSP header 80, component header 82 and binary image 84.

When a waveform is instantiated, the Waveform XML specifies which Vocoders should be loaded by the Voice Device. When a Vocoder is loaded, it is considered active and the file will be cached, reducing the overhead for subsequent instantiations of the same waveform. When the waveform is torn down, the vocoder is unloaded, which will mark the vocoder as inactive. This allows different waveforms to have overlapping Vocoder IDs without interfering with each other.

Each vocoder has the following functions defined to interoperate with the VDSP. The memory address entry points of these functions are placed at the beginning of the binary image, which allows the VDSP to dynamically link to these functions.

Encode—Converts the voice samples from the microphone into compressed data.

Decode—Converts the compressed data back into voice samples for playing out the speaker.

Config—Configures the vocoder library using the Vocoder Config data included in the VDSP configuration. This data is an unformatted byte string used to set up the vocoder library. It is especially useful if multiple vocoders are contained in a single library.

Flush—Clears out the vocoder buffers in preparation for a new session.

Abort—Aborts the current session and flushes the buffers.

Figure 9:
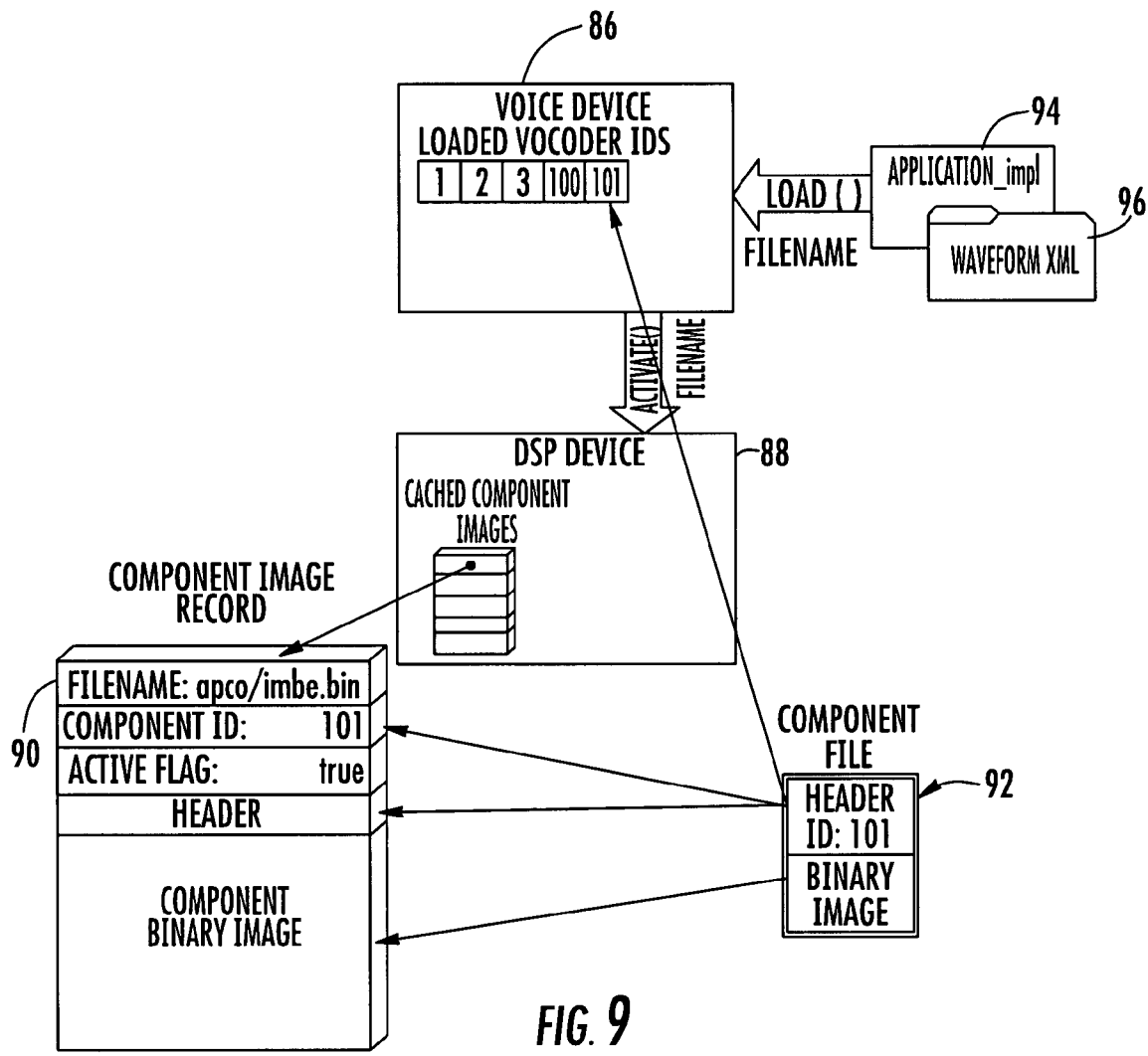
FIG. 9 is a block diagram showing a vocoder activation/caching process for voice and DSP devices in accordance with a non-limiting example of the present invention.

FIG. 9 shows a voice device 86, DSP device 88, component image record 90, component file 92 with header and binary image and application 94 and waveform XML 96. The Voice Device is a proxy to the DSP Device for loading vocoder images. The Waveform application will tell the Voice Device to load a vocoder file, which will forward this request to the DSP device. The DSP Device is responsible for caching the vocoder images and loading these images into the DSP when a Vocoder ID is requested.

The Voice Device will become a Loadable Device, allowing the Waveform XML to specify a driver to be loaded by the Voice Device. The other file types, such as Kernel Module, Executable and Shared Library, are ignored by the Voice Device. When a waveform is instantiated, the Core Framework (SCA Platform) will process the Waveform XML and will call load( ) on the Voice Device, passing in a FileSystem reference and an SCA-compatible pathname for the component file to be loaded. The Voice Device analyzes the component file to verify it is a vocoder image and will notify the DSP Device to activate the vocoder image. If the file activation in the DSP Device is successful, the Voice Device will retrieve the Vocoder ID from the file header and will add it to the list of active Vocoder IDs within the Voice Device.

The following are steps for radio initialization and waveform instantiation are illustrated relative to FIG. 9.

In radio initialization during radio power-up, the voice device is initialized. The voice device looks in the /usr/images/vocoders directory for any .bin files. For each .bin file found in this directory, the voice device tells the DSP device to activate this file. The DSP device looks in its component image cache to see if the filename already exists in the table. If the filename is not found, a new component image record is created using filename and the contents of the file to populate the filename, component ID, component header, and binary image fields. The DSP device sets the active flag in the component image record for this file. This component can now be requested by the DSP code to be loaded. If the DSP device activation was successful, the voice device looks at the image header in the file to retrieve the vocoder ID and adds this ID to the list of active vocoder ID's.

During waveform instantiation, the waveform XML specifies a driver file that should be loaded by the voice device. If this file is a .bin file, the voice device tells the DSP device to activate this file. The DSP device looks in its component image cache to see if the filename already exists in the table. If the filename is not found, a new component image record is created using filename and the contents of the file to population the filename, component ID, component header, and binary image fields. The DSP device sets the active flag in the component image record for this file. This component can now be requested by the DSP code to be loaded. If the DSP device activation was successful, the voice device looks at the image header in the file to retrieve the vocoder ID and adds this ID to the list of active vocoder ID's.

When the waveform is configured and the audio configuration is passed to the Voice Device, the Vocoder ID to be loaded is validated against the list of active Vocoder ID's. If the specified ID is not found, the configure operation fails. If a built-in audio algorithm is specified in the audio configuration, the Voice Device translates this value into the appropriate Vocoder ID and Vocoder Configuration to select the specified audio algorithm.

The audio configuration for custom vocoders includes waveform-specific Vocoder ID and vocoder configuration byte string for passing configuration data to the vocoder library. The audio configuration enumerations and structures are shown in Listing 1, which is pulled from the audioio_types.idl. The AudioIoConfigurationType structure provides a mechanism for providing separate configuration for receiver and transmitter, allowing separate vocoder libraries or vocoder configurations for receiver operations and transmitter operations. The txAudioAlgorithm and rxAudioAlgorithm values are unsigned long values and can be either a value from the AudioAlgorithm enumeration or a custom library ID that is greater than CUSTOM_ALGORITHM_START. The txVocoderData and rxVocoderData are generic byte strings that are used to configure the custom vocoder libraries. The txVocoderData/rxVocoderData values are ignored if the txAudioAlgorithm/rxAudioAlgorithm is set to a value from the AudioAlgorithm enumeration.

Listing 1: New AudioIoConfigurationType Structure (from audioio_types.idl)

```
/**
 * Vocoder IDs for the Harris Built-in Audio Algorithms
 */
enum AudioAlgorithm
{
    VOICE_ANALOG,
    VOICE_CVSD,
    VOICE_LPC600,
    VOICE_LPC2400,
    VOICE_MELP600,
    VOICE_MELP2400
    // VOICE_CUSTOM is removed from this list
};
const unsigned long CUSTOM_ALGORITHM_START = 100;
struct AudioIoConfigurationType
{
    // The selected type of CVSD algorithm.
    CvsdType cvsdAlgorithm;
    // LPC Configuration parameters
    LpcCfg lpcConfiguration;
    // The sample rate at which the PCM codec will operate.
    unsigned long pcmSampleRate;
    // The size of the samples to obtain from the PCM codec.
    unsigned short pcmSampleSize;
    // The ID of the vocoder to use for RX and TX voice traffic.
    // Use the AudioAlgorithm enum to define the Harris Built-in
    // Vocoder IDs.
    unsigned long txAudioAlgorithm;
    unsigned long rxAudioAlgorithm;
    // Vocoder Configuration Data for the Custom Vocoder
    CF::OctetSequence txVocoderData;
    CF::OctetSequence rxVocoderData;
    //speaker enable and sidetone -- out parameters
    boolean speakerEnabled;
    boolean sidetoneEnabled;
    boolean micPttEnabled;
    boolean extKeylineEnabled;
    // data rate associated with algorithm -- out parameter
    unsigned long dataRate;
    // Contains generic configuration items.
    AudioCfg audioConfiguration;
    // Contains the desired packet size for Receive and Transmit.
    AudioDesiredPacketDuration    txDesiredPacketDuration;
    AudioDesiredPacketDuration    rxDesiredPacketDuration;
};
```

Typically, the Voice Device sends the audio configuration to the VDSP when receive data begins flowing or a transmit session is started. This is too late for the dynamic vocoder loading scenario since the receive/transmit session will be suspended until the vocoder image is loaded. When the DSP Device is stopped, it tears down the channel communications with the VDSP, preventing the Voice Device from sending the request to the VDSP to load a vocoder image. When the waveform is being started, the DSP Device is started before the Voice Device and the Voice Device can tell the VDSP to load the receiver vocoder image as part of its Start( ) operation. The Voice Device would not wait for the vocoder image to load before returning from Start( ), allowing the image to be loaded while the waveform start is completed. The vocoder image should be loaded by the time a receive or transmit session is requested, but if it is not, the session configuration would be pended until the image load is complete. This time should be minimal since the bulk of the work should have been completed before the receiver/transmit session was requested.

When the waveform is being torn down, or de-instantiated, the Core Framework tells the Voice Device to unload any files that were loaded when the waveform was being instantiated. The Voice Device extracts the Vocoder ID from the file being unloaded and removes the ID from the list of active Vocoder IDs. The DSP Device is then notified to deactivate the vocoder image by the Voice Device. This vocoder library can no longer be selected as a vocoder to load into the VDSP. This process is depicted in FIG. 10.

Figure 11:
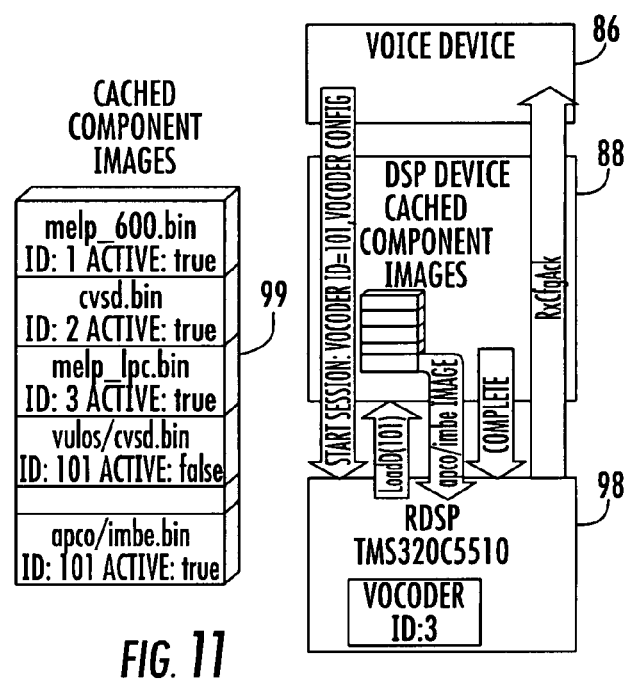
FIG. 11 is a block diagram showing vocoder initialization on the receiver and transmitter session.

FIG. 11 shows vocoder initialization during a transmit/receive session create. The red DSP 98 is illustrated also and cached component images 99.

Figure 10:
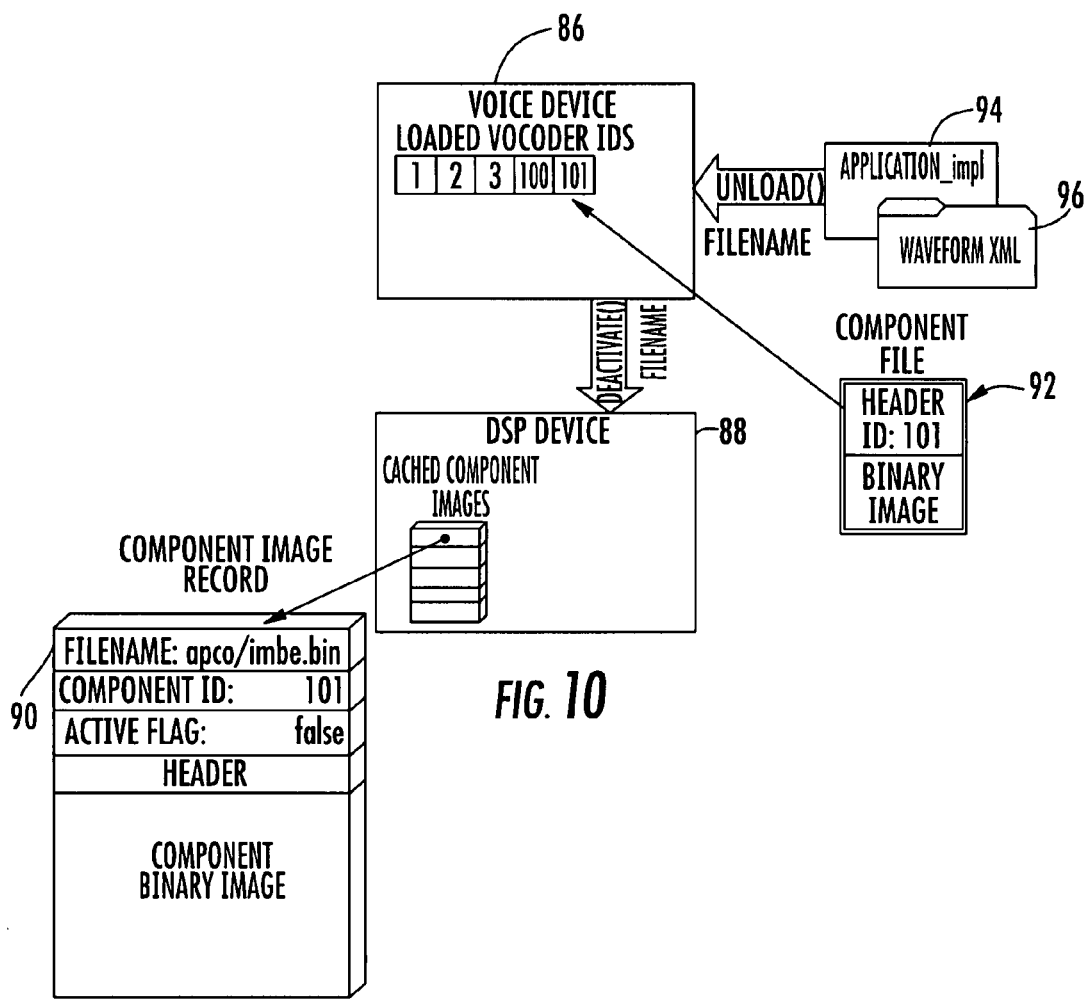
FIG. 10 is a block diagram showing a vocoder deactivation for the voice and DSP devices and showing waveform de-instantiation.

The waveform de-instantiation process relative to FIG. 10 is now described.

When the waveform is torn down or de-instantiated, the files loaded by the waveform XML are unloaded by the core framework. If the file is a bin file, the voice device reads the image header to retrieve the vocoder ID and removes this ID from the list of active vocoder ID's. The voice device tells the DSP device to deactivate this file. The DSP device looks in its component image cache for the component image record corresponding to the filename to deactivate. The DSP device resets the active flag in the component image record for this file. This component can no longer be requested by the DSP code for loading.

The receive/transmit session start relative to FIG. 11 is now described.

When data begins flowing to or from the voice device, a receive or transmit session is started and the voice device sends the receive/transmit configuration down to the VDSP. This configuration consists of a vocoder ID and the vocoder data byte string that was provided to the voice device when the waveform was configured. The VDSP checks the ID of the currently loaded vocoder, if any, and requests from the DSP device the component ID (i.e., vocoder ID) if the ID of the loaded vocoder does not match the requested vocoder ID. The DSP device looks in the list of cached component images to find a component image record that matches the requested component ID and has the active flag set to true. If an image is found, the DSP device begins a byte block load of the binary image from the component image record. Once the load is complete, the DSP device sends a message to the DSP indicating the component image load is complete. This message also contains the ID of the component that was loaded. The VDSP passes the vocoder data by the string to the vocoder library to configure the vocoder. The VDSP sends the RXCfgAck message to the voice device. The receive/transmit session initialization is complete and the voice device begins flowing data to/from the VDSP.

Figure 12:
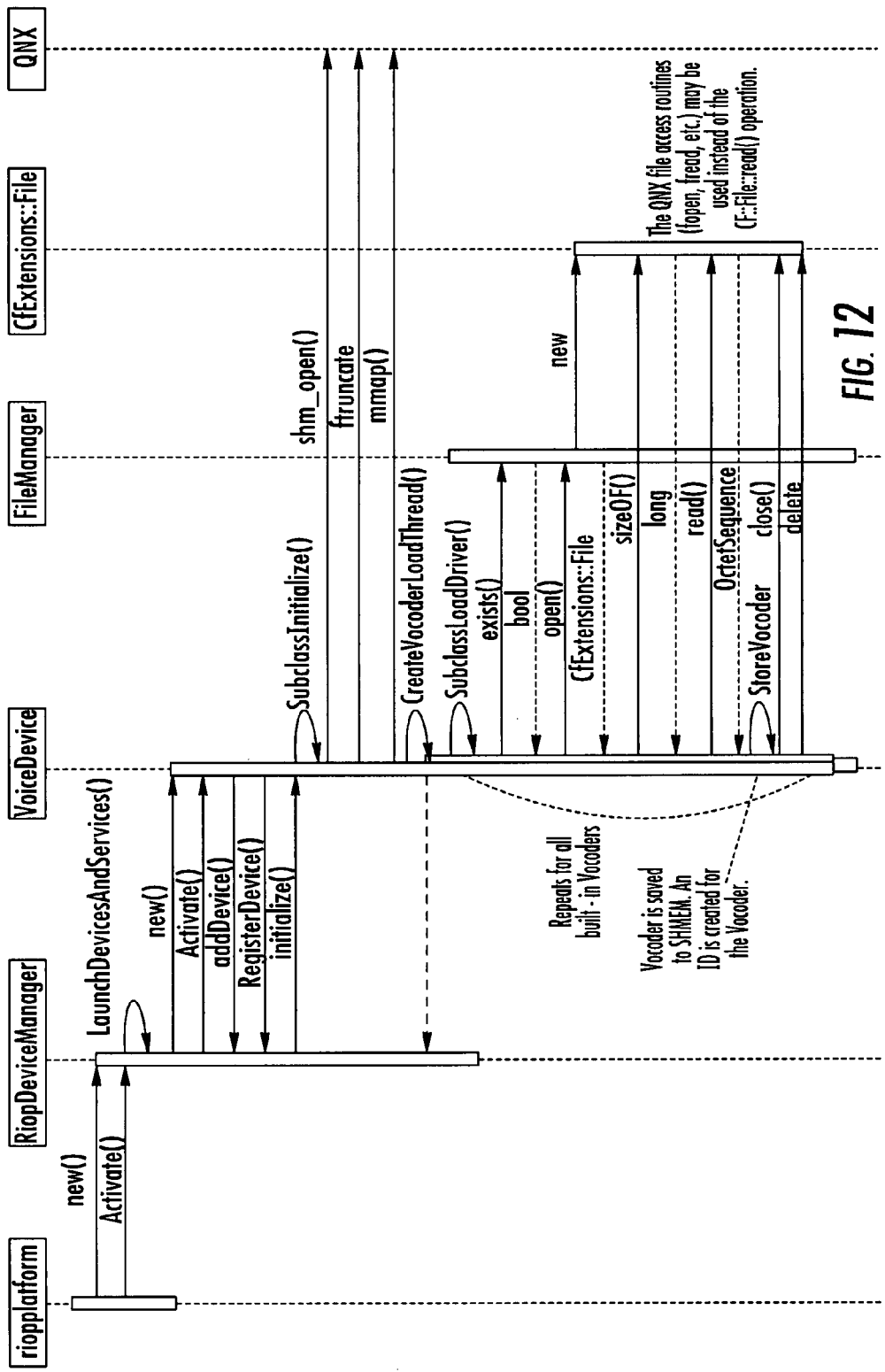
FIG. 12 is a sequence diagram showing the loading of built-in vocoders on power-up in accordance with a non-limiting example of the present invention.
Figure 13:
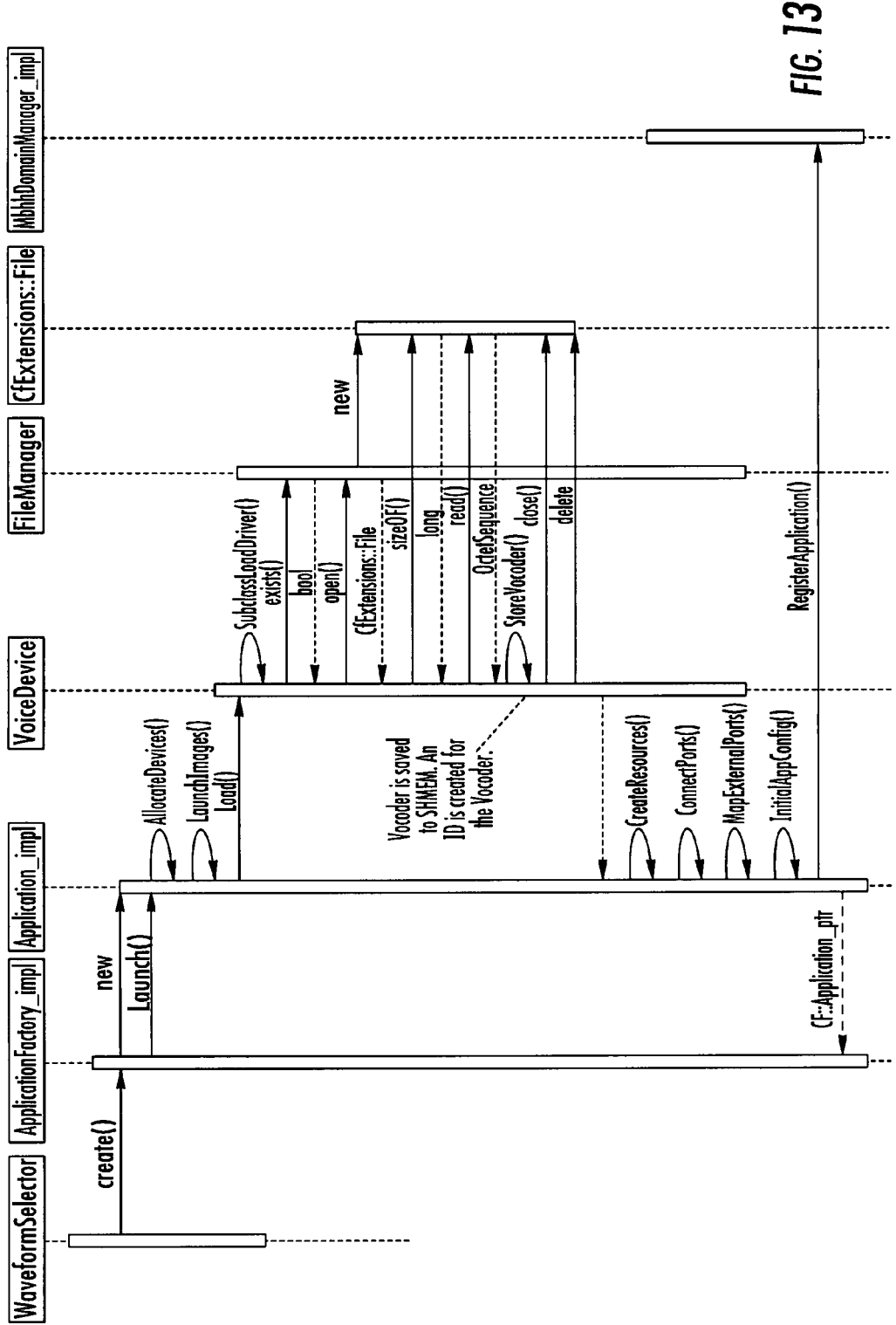
FIG. 13 is a sequence diagram showing the loading of a custom vocoder on the waveform application launch in accordance with a non-limiting example of the present invention.
Figure 14:
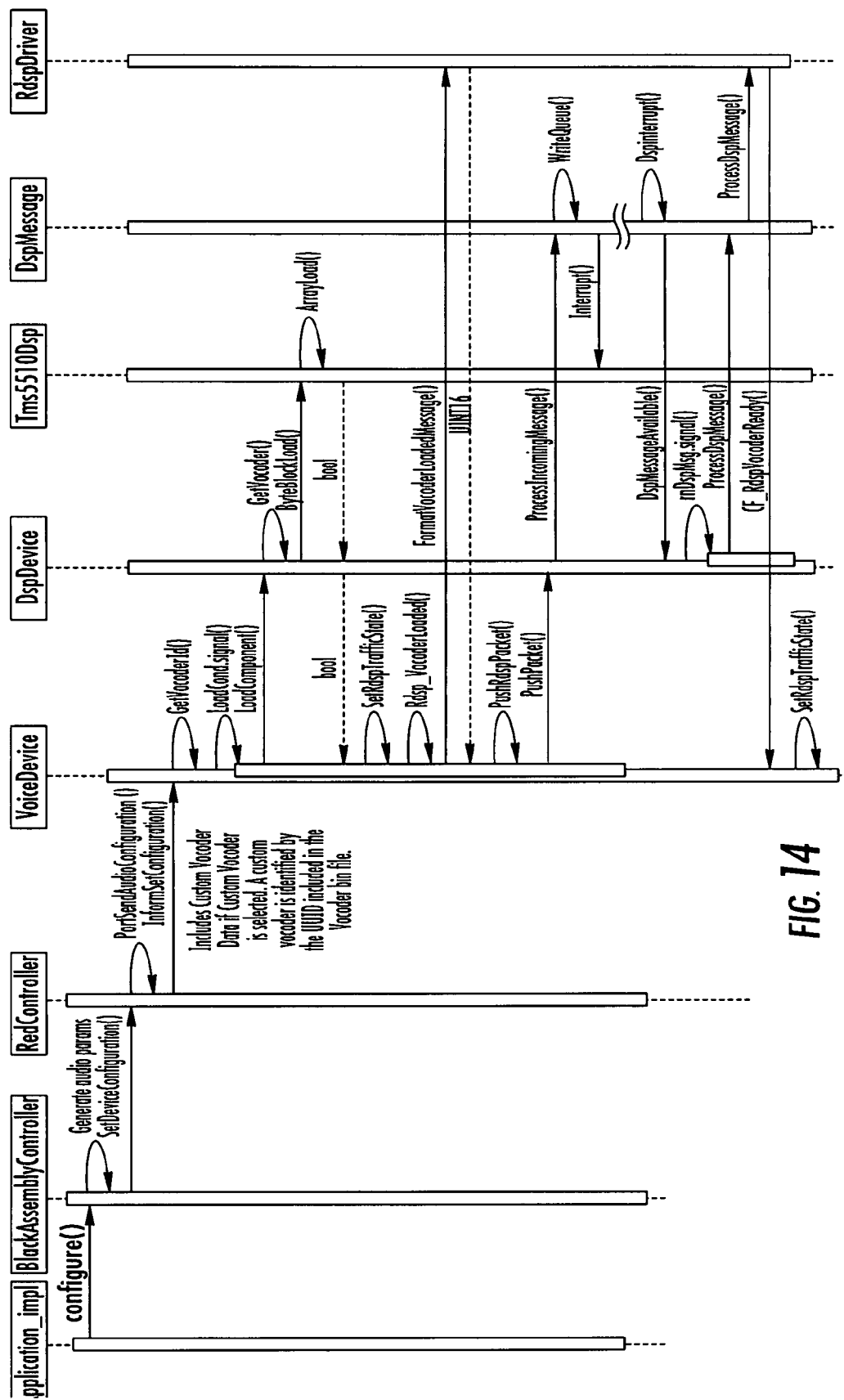
FIG. 14 is a sequence diagram showing the selection of a custom vocoder on preset selection in accordance with a non-limiting example of the present invention.

FIGS. 12-14 show basic sequence diagrams for loading the built-in vocoder on power-up and on the waveform application launch and selecting custom vocoder.

Figure 15:
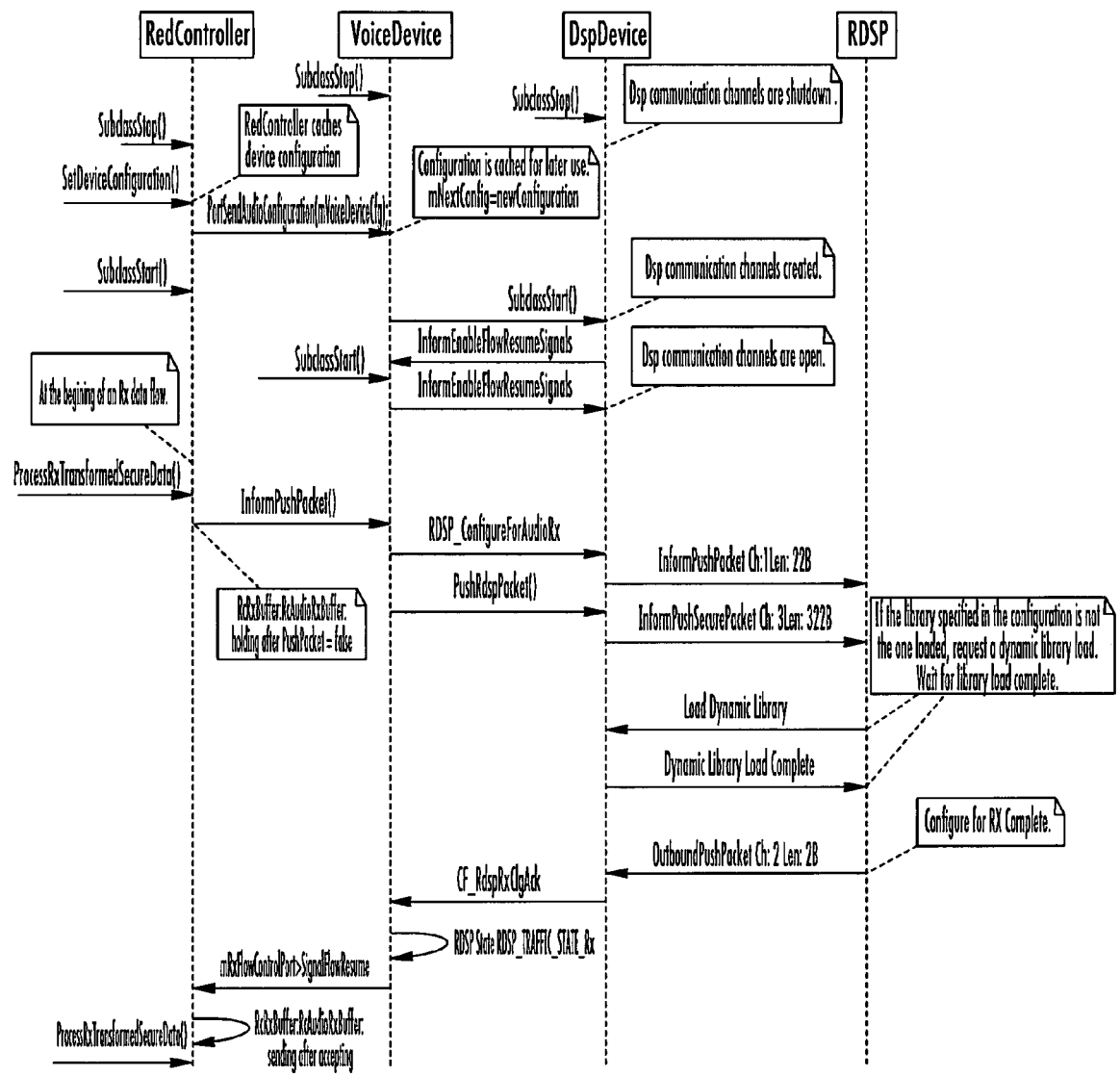
FIG. 15 is a sequence diagram showing the loading of a dynamic library in accordance with a non-limiting example of the present invention.

One aspect of the vocoder loader is the vocoder description table. A sequence diagram for use of such vocoder table is shown in FIG. 15.

Figure 16:
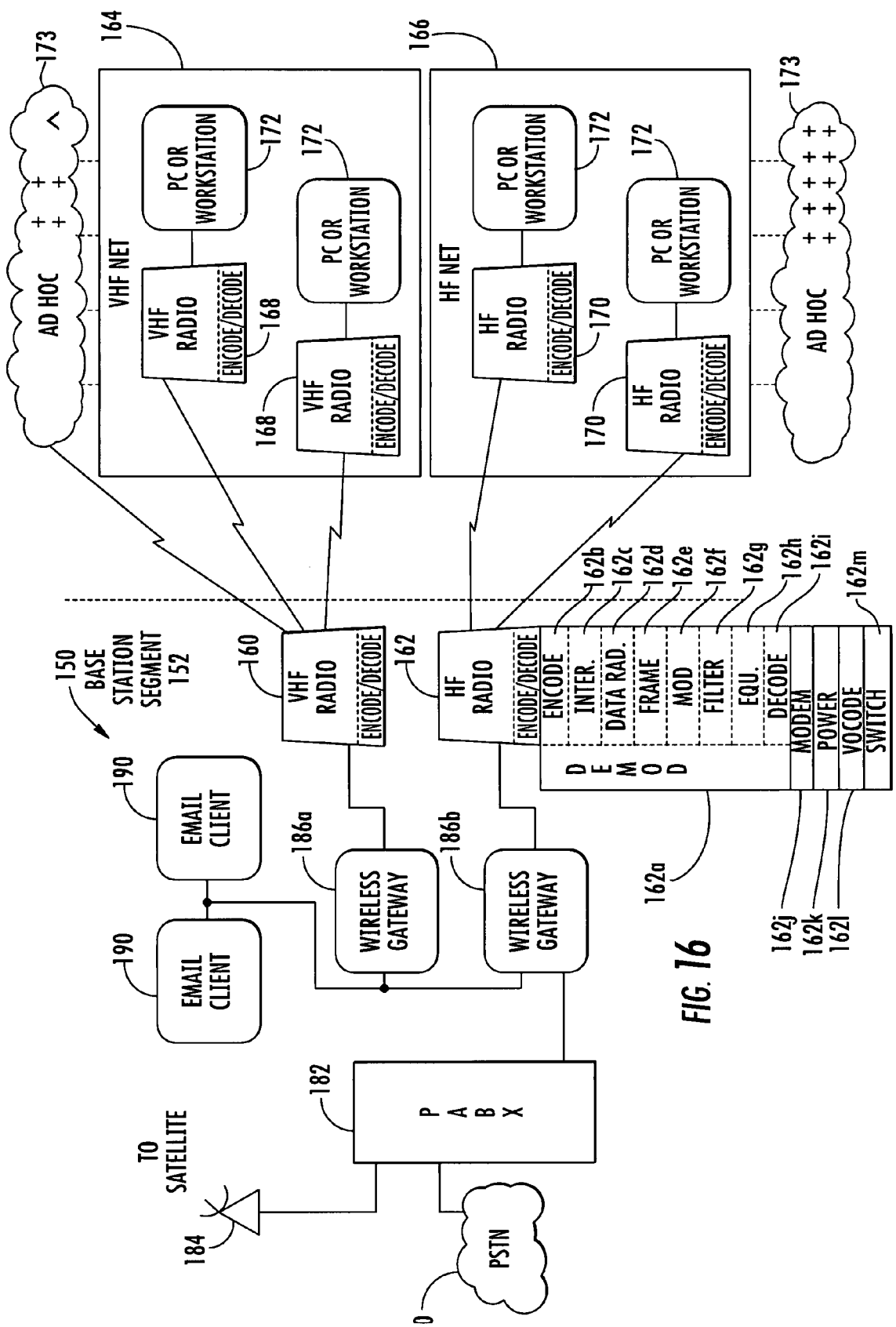
FIG. 16 is an example of a radio environment that can be adapted for use in accordance with a non-limiting example of the present invention.

For purposes of description only, a brief description of an example of a communications system that would benefit from the present invention is described relative to a non-limiting example shown in FIG. 16. This high-level block diagram of a communications system includes a base station segment 152 and wireless message terminals that could be modified for use with the present invention. The base station segment 152 includes a VHF radio 160 and HF radio 162 that communicate and transmit voice or data over a wireless link to a VHF net 164 or HF net 166, each which include a number of respective VHF radios 168 and HF radios 170, and personal computer workstations 172 connected to the radios 168,170. Ad-hoc communication networks 173 are inter-operative with the various components as illustrated. Thus, it should be understood that the HF or VHF networks include HF and VHF net segments that are infrastructure-less and operative as the ad-hoc communications network. Although UHF radios and net segments are not illustrated, these could be included.

The HF radio can include a demodulator circuit 162a and appropriate convolutional encoder circuit 162b, block interleaver 162c, data randomizer circuit 162d, data and framing circuit 162e, modulation circuit 162f, matched filter circuit 162g, block or symbol equalizer circuit 162h with an appropriate clamping device, deinterleaver and decoder circuit 162i modem 162j, and power adaptation circuit 162k as non-limiting examples. A vocoder circuit 162l can incorporate the decode and encode functions and a conversion unit which could be a combination of the various circuits as described or a separate circuit. A transmit key switch 162m is operative as explained above. These and other circuits operate to perform any functions necessary for the present invention, as well as other functions suggested by those skilled in the art. The circuits referenced here may include any combination of software and/or hardware elements, including but not limited to general purpose microprocessors and associated software, specialized microprocessors for digital signal processing and their associated software, Application Specific Integrated Circuits (ASICs), Field Programmable Gate Arrays (FPGAs), logic circuits, or other kinds of devices and/or software or firmware known to those skilled in the art. Other illustrated radios, including all VHF mobile radios and transmitting and receiving stations can have similar functional circuits.

The base station segment 152 includes a landline connection to a public switched telephone network (PSTN) 180, which connects to a PABX 182. A satellite interface 184, such as a satellite ground station, connects to the PABX 182, which connects to processors forming wireless gateways 186a, 186b. These interconnect to the VHF radio 160 or HF radio 162, respectively. The processors are connected through a local area network to the PABX 182 and e-mail clients 190. The radios include appropriate signal generators and modulators. The non-packetized digital voice information transmitted within the network using the techniques of the present invention can originate at or be delivered to a handset connected to one of the radios, a telephone or other interface device attached to a wireless gateway device such as the RF-6010 Tactical Network Hub, or a subscriber telephone connected to the PABX or within the public switched telephone network.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 6010, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A software defined radio, comprising:
   a radio circuit; and
   an executable radio software system operable with the radio circuit and conforming to the Software Communications Architecture (SCA) specification and defining an operating environment that includes a plurality of waveform components that are loaded when the radio circuit is initialized and a waveform component is instantiated and cached and the same waveform component is reloaded at runtime after the waveform component is instantiated for transmitting and receiving voice and data.

2. A software defined radio according to claim 1, wherein said radio circuit further comprises a radio device and memory, and further comprising a waveform XML that specifies one or more waveform components to be cached within memory by said radio device at waveform instantiation.

3. A software defined radio according to claim 2, wherein said radio device comprises a voice device operable as a vocoder.

4. A software defined radio according to claim 2, wherein each waveform component further comprises a header and waveform-specific component identifier (ID) in its header that is marked active as waveform components are cached in memory.

5. A software defined radio according to claim 2, wherein said radio device is operable for loading a waveform component based on an active ID.

6. A software defined radio according to claim 1, which further comprises a digital signal processor (DSP) into which waveform components are loaded.

7. A software defined radio according to claim 6, wherein said DSP is operative for requesting waveform component changes.

8. A software defined radio according to claim 1, and further comprising image files associated with waveform components.

9. A software defined radio according to claim 8, wherein cached waveform components include a header and an inactive ID preventing other waveform components from loading any image files associated with a waveform component in cache.

10. A software defined radio according to claim 1, which further comprises a portable housing in which said radio circuit and processor are contained and configured for handheld use.

11. A software defined radio, comprising:
a radio circuit that includes a voice device; and
an executable radio software system operable with the radio circuit and conforming to the Software Communications Architecture (SCA) specification and defining an operating environment that includes a plurality of waveform components containing one or more loadable waveform specific vocoders as drivers for the voice device that are loaded when the radio circuit is initialized and a waveform component is instantiated and the same waveform component is reloaded at runtime after the waveform component is instantiated for transmitting and receiving voice and data.

12. A software defined radio according to claim 11, wherein said radio circuit further comprises a radio device and memory, and further comprising a waveform XML that specifies one or more waveform components to be cached within memory by said voice device at waveform instantiation.

13. A software defined radio according to claim 12, wherein each waveform component further comprises a header and vocoder identifier (ID) in its header that is marked active as waveform components are cached in memory.

14. A software defined radio according to claim 13, wherein said voice device is operable for loading a waveform component based on an active vocoder ID.

15. A software defined radio according to claim 11, which further comprises a digital signal processor (DSP) into which waveform components are loaded.

16. A software defined radio according to claim 15, wherein said DSP is operative for requesting waveform component changes.

17. A software defined radio according to claim 11, and further comprising vocoder image files associated with waveform components.

18. A software defined radio according to claim 17, wherein cached waveform components include an inactive vocoder ID preventing other waveform components from loading any image files associated with a waveform component in cache.

19. A software defined radio according to claim 11, which further comprises a portable housing in which said radio circuit and processor are contained and configured for handheld use.

20. A method for operating a software defined radio that comprises a radio circuit and an executable radio software system operable with the radio circuit and conforming to the Software Communications Architecture (SCA) specification, comprising:
loading at least one waveform component when the radio circuit is initialized and instantiating and caching a waveform component; and
reloading the same waveform component at runtime after the waveform component is instantiated.

21. The method according to claim 20, which further comprises specifying through a waveform XML one or more waveform components to be cached within memory.

22. The method according to claim 21, which further comprises marking as active using and header and identifier (ID) any waveform components cached within memory.

23. The method according to claim 22, which further comprises loading a waveform component based on an ID.

24. The method according to claim 20, which further comprises associating image files with waveform components.

25. A software defined radio, comprising:
a radio circuit; and
an executable radio software system operable with the radio circuit and conforming to the Software Communications Architecture (SCA) specification and defining an operating environment that includes a plurality of waveform components that are loaded when the radio circuit is initialized and a waveform component is instantiated and reloaded at runtime after the waveform component is instantiated for transmitting and receiving voice and data, wherein said radio circuit further comprises a radio device and memory, and further comprising a waveform XML that specifies one or more waveform components to be cached within memory by said radio device at waveform instantiation.

26. A software defined radio, comprising:
a radio circuit; and
an executable radio software system operable with the radio circuit and conforming to the Software Communications Architecture (SCA) specification and defining an operating environment that includes a plurality of waveform components that are loaded when the radio circuit is initialized and a waveform component is instantiated and reloaded at runtime after the waveform component is instantiated for transmitting and receiving voice and data, and further comprising image files associated with waveform components that are cached, wherein any cached waveform components include a header and an inactive ID preventing other waveform components from loading any image files associated with a waveform component in cache.

27. A software defined radio, comprising:
a radio circuit that includes a voice device; and
an executable radio software system operable with the radio circuit and conforming to the Software Communications Architecture (SCA) specification and defining an operating environment that includes a plurality of waveform components containing one or more loadable waveform specific vocoders as drivers for the voice device that are loaded when the radio circuit is initialized and a waveform component is instantiated and reloaded at runtime after the waveform component is instantiated for transmitting and receiving voice and data, wherein said radio circuit further comprises a radio device and memory, and further comprising a waveform XML that specifies one or more waveform components to be cached within memory by said voice device at waveform instantiation.

28. A software defined radio, comprising:

a radio circuit that includes a voice device; and an executable radio software system operable with the radio circuit and conforming to the Software Communications Architecture (SCA) specification and defining an operating environment that includes a plurality of waveform components containing one or more loadable waveform specific vocoders as drivers for the voice device that are loaded when the radio circuit is initialized and a waveform component is instantiated and reloaded at runtime after the waveform component is instantiated for transmitting and receiving voice and data, and further comprising vocoder image files associated with waveform components wherein cached waveform components include an inactive vocoder ID preventing other waveform components from loading any image files associated with a waveform component in cache.

29. A method for operating a software defined radio that comprises a radio circuit and an executable radio software system operable with the radio circuit and conforming to the Software Communications Architecture (SCA) specification, comprising:

loading at least one waveform component when the radio circuit is initialized or a waveform component is instantiated;

reloading the waveform component at runtime after the waveform component is instantiated; and specifying through a waveform XML one or more waveform components to be cached within memory.

* * * * *